Dec. 4, 1962
R. W. YOUNG
3,066,688
MEANS FOR PRODUCING BLASTS OF COMPRESSED GAS
OR VAPOUR OF GIVEN DURATION AND PERIODICITY
Filed April 10, 1959
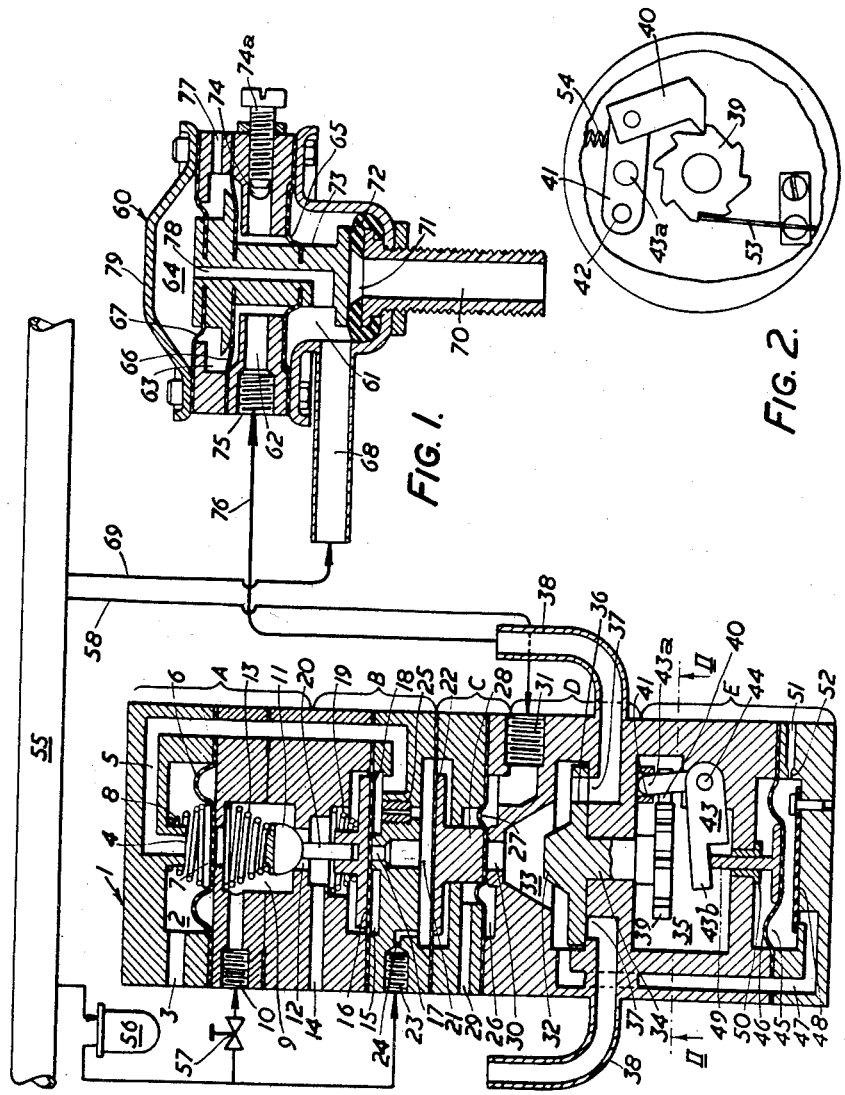
INVENTOR
ROBERT WILLIAM YOUNG
BY
Irwin S. Thompson
ATTORNEY

United States Patent Office 3,066,688
Patented Dec. 4, 1962

3,066,688
MEANS FOR PRODUCING BLASTS OF COMPRESSED GAS OR VAPOUR OF GIVEN DURATION AND PERIODICITY
Robert William Young, The Orchard House, Little Herberts Road, Charlton Kings, Cheltenham, England
Filed Apr. 10, 1959, Ser. No. 805,622
Claims priority, application Great Britain Apr. 10, 1958
19 Claims. (Cl. 137—12)

This invention is concerned with the provision of means for producing blasts of compressed gas or vapour of given duration and periodicity.

In certain types of industrial plant there is a requirement for a blast of compressed gas or vapour, usually compressed air, of short duration and repeated at regular intervals. One example of the use of such cyclic gas blasts is that employed during the so-called "backwashing" or reverse flow cleaning of a filter chamber or bag of a gas filtration plant of the type in which the dust-laden gas is passed into a housing containing one or more filter chambers or bags. The gas passes through the wall of the chamber or bag while the dust is left clinging to the outer surface of the latter. The backwashing or reverse gas flow step is introduced for the purpose of setting up a shock wave inside the or each chamber or bag so that the flow of gas therethrough is momentarily reversed or stopped as a result of which the filter cake which has built up on the outer surface of the chamber or bag detaches itself and falls into a hopper at the bottom of the housing.

Normally the housing contains a number of the filter chambers or bags arranged in parallel and it is an operational requirement that the reverse gas blast should be applied to the chamber or bags in sequence so that the plant is never taken out of operation. For this reason it is important to have means for accurately timing the duration of the reverse gas blast and the interval between blasts. It is also desirable to have means for controlling the waveform of the reverse gas blast. Such means or controls have hitherto been electrical, comprising a number of solenoid-operated valves equivalent to the number of filter chambers or bags, and the control means has accordingly been costly and moreover subject to an even greater disadvantage. This disadvantage is that the dust-laden gases with which the filtration plant has to deal are very often of a highly explosive character and it is evident, therefore, that the use of electrical control means in association with such plants is very undesirable.

The present invention has for its object to provide new or improved means for producing blasts of compressed gas or vapour of timed duration and periodicity for whatever purpose but which, when used for reverse flow cleaning in gas filtration plants of the type already mentioned, overcome the disadvantages of the known electrical control means.

According to one feature of the invention control means for timing the duration and periodicity of the blast include a main control chamber adapted to be supplied at a metered rate from a pressure supply of operating fluid, valve means for cyclically connecting and disconnecting the main control chamber to and from an expansion space, and a main valve controlled automatically in response to pressure changes in the main control chamber.

The main valve may be used to produce the blast directly though in many applications it will be desirable that the main valve should be a pilot valve controlling one or more blast valves.

The expansion space may be provided by an expansion chamber permanently connected to the main control chamber via a bleed passage in which case the valve means may operate automatically in response to pressure conditions within the expansion chamber and include an expansion valve disposed between the expansion chamber and the main control chamber.

In one of its forms control means according to the invention include a main valve responsive to pressure within a main control chamber, a first flow restrictor adapted to connect the main control chamber to pneumatic fluid under pressure and control the rate of pressure build-up in the main control chamber, an expansion chamber permanently connected to the main control chamber through a bleed passage, an expansion valve between the expansion chamber and the main control chamber and responsive to pressure within the expansion chamber, an exhaust valve responsive to pressure within an auxiliary control or timing chamber and controlling an exhaust path from the expansion chamber, a second flow restrictor adapted to connect the auxiliary control chamber to pneumatic fluid under pressure to control the rate of pressure build-up in the auxiliary control chamber, and a pilot exhaust valve responsive directly or indirectly to operation of the expansion valve and controlling an exhaust path from the auxiliary control chamber.

The pilot exhaust valve is preferably responsive directly to operation of the expansion valve, and may comprise a valve member mechanically coupled to a valve member of the expansion valve. When responsive indirectly to operation of the expansion valve, the pilot exhaust valve may be responsive directly to operation of the main valve or to the pressure within the expansion chamber which themselves result from operation of the expansion valve.

The term "pneumatic fluid" when used herein is intended to include all suitable gaseous fluids and vapours.

Preferably the exhaust valve opens at a given pressure in the auxiliary control or timing chamber, and the main valve preferably closes in response to pressure rise in the main control chamber and opens in response to the pressure drop in the main control chamber when the expansion valve opens.

The bleed passage may be formed in the expansion valve itself, to this end the latter having a small leak when closed.

Preferably an adjustable regulating or timing valve, for example a needle-type valve, is used for the second flow restrictor in which case its adjustment will serve to vary the periodicity of the blasts by controlling the length of the intervals between blasts.

An adjustable regulating valve may also be used as the first flow restrictor in which case its adjustment will govern the duration of the blasts, i.e. the open time of the main valve. The same purpose may be achieved by providing an adjustment for the expansion valve whereby the pressure in the expansion chamber at which it operates may be varied.

All or some of the valves may be of a diaphragm type, in which case the various chambers may be at least in part formed by the diaphragm chambers of the respective valves.

According to another feature of the invention, a method of controlling the duration and periodicity of a succession of air blasts applicable to the control of a manufacturing process includes the steps of feeding an operating fluid at a metered rate to a main control space, alternately connecting and disconnecting the main control space to and from an expansion space, and automatically controlling a main valve in response to pressure changes in the control space.

Preferably the method comprises the steps of supplying pneumatic fluid to the main control space at a metered rate to produce a pressure rise therein, bringing about the cessation of a blast period in response to this pressure rise, continuously bleeding the pneumatic fluid from the main control space to the expansion space, supplying pneumatic fluid to an auxiliary control space at a metered rate to produce a pressure rise therein, closing an exhaust passage from the expansion space in response to the last-mentioned pressure rise to produce a pressure rise in the expansion space, interconnecting the main control space and the expansion space in response to the pressure rise in the latter to produce a pressure drop in the main control space and a pressure rise in the expansion space, bringing about commencement of a fresh blast period in response to the pressure drop in the main control space and opening an exhaust passage from the auxiliary control space in response directly or indirectly to the pressure rise in the expansion space thereby to produce a pressure drop in the auxiliary control space, opening the exhaust passage from the expansion space in response to the pressure drop in the auxiliary control space to produce a pressure drop in the expansion space, and breaking the interconnection between the main control space and the expansion space and closing the exhaust passage of the auxiliary control chamber in response to the pressure drop in the expansion space.

The invention will now be further described with reference to the accompanying drawings which illustrate, by way of example, a gas operated limiting output pulsator forming control means according to one embodiment of the invention, and in which:

FIGURE 1 is a diagrammatic cross-sectional view of the pulsator, and

FIGURE 2 is a detail diagrammatic view on the line II—II of FIGURE 1.

The pulsator 1 incorporates a distributor adapted to direct gas pulses produced by the pulsator in turn to a number of blast valves and is of unit construction and generally cylindrical shape, and it can be considered as comprising a plurality of interconnected sandwiched sections. From one end of the unit these sections are arranged in the following order: An interval timer section A, an impulse timer section B, a main valve section C, a distributor section D and a distributor actuator section E. The pulsator can be mounted in any desired position, but for the purposes of the following description it will be considered, as illustrated, with the interval timer section A uppermost.

The timer section A has an internal space 2 which is permanently vented to atmosphere at 3 and contains an exhaust valve port 4 permanently communicating with the timer section B through a passageway 5 formed in the body of the unit. This space 2 is limited on its lower side by an impervious flexible diaphragm 6 which carries an exhaust valve closure member 7 adapted to seal the port 4. A compression spring 8 within the space 2 urges the diaphragm 6 away from the port 4 to open the exhaust valve formed by that port and the valve member 7. An auxiliary control or timing chamber 9 within the section A communicates at its upper end with the underside of the diaphragm 6 and also communicates permanently with a timing valve connection 10 on the outer surface of the unit. A pilot exhaust valve within the section A comprises a poppet type valve member 11 and a co-operating valve port 12, the valve member 11 being urged downwardly to a valve closing position by a valve spring 13 within the chamber 9. When the pilot exhaust valve opens the chamber 9 is vented to atmosphere at 14.

An expansion chamber 15 within the impulse timer section B is limited on its upper side by an impervious flexible diaphragm 16 and is connected to the passageway 5. The chamber 15 and the passageway 5 together form an expansion space of the pulsator. At its other side the chamber 15 has formed an expansion valve port 17 arranged to be sealed by the diaphragm 16 which carries an expansion valve member 18. The valve member 18 and with it the diaphragm 16 are urged downwards by a valve spring 19 towards the valve port 17 to close the expansion valve formed by the latter and the valve member 18.

The space above the diaphragm 16 is vented to atmosphere at 14, and a stem 20 of the valve member 11 engages in a central bore in the valve member 18 with a slight amount of axial clearance to allow the valve members 11 and 18 to seat firmly on their respective seatings at the same time.

A main control chamber 21 communicates at its upper side with the valve port 17 and is limited on its lower side by a flexible impervious diaphragm 22. The chamber 21 communicates permanently with an external connection 23 on the outer surface of the unit through a first flow restrictor 24 and also with the chamber 15 through a restrictor 25 forming a bleed passage.

The main valve section C incorporates a main valve chamber 26 limited on its upper side by an impervious flexible diaphragm 27 which is spaced from and connected to the diaphragm 22 by a main valve member 28. The space between the diaphragms 22 and 27 is permanently vented to atmosphere at 29, and the diaphragm 27 and valve member 28 are adapted to seal a main valve port 30 leading from the chamber 26 on the lower side thereof. The effective area of the diaphragm 22 of the chamber 21 is greater than the effective area of the diaphragm 27 of the chamber 26, and a gas inlet conduit 31 formed in the body of the unit communicates permanently with the valve chamber 26.

The distributor section D has a rotary distributor disc valve member 32 which is rotatably mounted co-axially with the unit within a valve chamber 33 which communicates at its upper side with the valve port 30. A spindle 34 of the valve member 32 projects into a chamber 35 of the distributor actuator section E and is adapted, in a manner later described, to be indexed in synchronism with each pulsation produced by the unit. The valve member 32 has a single axially directed valve bore 36 which, during the indexing movement, is aligned in turn with a ring of outlet ports such as 37 which communicate individually with a plurality of pulse outlet conduits such as 38. Thus indexing movement of the valve member 32 provides communication between the main valve port 30 and the outlet conduits 38 one at a time in succession. These outlet conduits are equiangularly disposed radially of the unit and project from the latter in a plan normal to the longitudinal axis of the unit.

Within the chamber 35, which is permanently vented to atmosphere, there is arranged a pawl and ratchet mechanism for producing the indexing movement of the valve member 32. This mechanism comprises a ratchet wheel 39 mounted on the lower end of the valve spindle 34 and a pawl 40 which is pivotally mounted in the plane of the ratchet wheel 39 on one end of a pawl-carrying lever 41. The lever 41 is itself pivotally mounted adjacent one end on a pivot pin 42 about an axis parallel to the longitudinal axis of the unit. A bell-crank lever 43 of the mechanism is pivotally mounted on a pivot pin 44 about an axis normal to said longitudinal axis, and has an upwardly directed arm 43a which engages in a bore approximately mid-way along the lever 41 and a radially inwardly directed substantially horizontal arm 43b. At its lower end the section E incorporates an actuator control chamber 45 which is limited on its upper side by an impervious flexible diaphragm 46 and connected through a large bore passageway 47 formed in the body of the unit and a one-way flap valve 48 to the distributor valve chamber 33. On its upper side the diaphragm 46 carries an operating stem 49 which is flanged at its lower end for attachment to the diaphragm 46 and slidably mounted in a central bushing 50 of the unit. The chamber 45 is permanently vented to atmosphere at 51 through a bleed restrictor 52. A reed 53 acts to prevent reversing movement of the ratchet wheel 39 during resetting movement of the pawl 40. The stem 49 co-operates with the arm 43b of the bell-crank lever, and upward movement of the diaphragm 46 serves to rock the bell-crank lever 43 in a direction to produce a resetting movement of the pawl. On downward retraction of the diaphragm 46 an operative movement of the pawl 40 is produced by a compression spring 54 disposed between the wall of the chamber 35 and the pawl-carrying lever 41.

In use the unit is connected to a gas supply line 55 as shown diagrammatically in FIGURE 1. A filter 56 connected to the line 55 supplies gas under pressure to the connection 10 through an adjustable needle-type timing valve 57 forming a second flow restrictor and also to the connection 23. A pipe 58 connects the line 55 to the gas inlet conduit 31. Opening the timing valve 57 initiates cyclic operation of the unit and the following cycle of operations occurs.

The gas flows through the restrictor 24 into the main control chamber 21 to urge the diaphragms 22 and 27 in a direction to close the main valve port 30. These diaphragms are acted upon by the differential force produced by the pressure in the control chamber 21 acting upon the diaphragm 22 and the gas supply pressure present in the main valve chamber 26 acting on the diaphragm 27, the latter being the one of lesser area. At the same time the gas passes through the timing valve 57 into the timing chamber 9, building up a pressure there in at a rate dependent upon the setting of the valve 57.

As the pressure in the chamber 9 builds up it reaches a level, depending on the strength of the exhaust valve spring 8, at which it displaces the diaphragm 6 until the valve member 7 closes the exhaust valve port 4.

After the pressure in the chamber 9 has closed the exhaust valve, pressure is able to build up in the expansion chamber 15. For this purpose the gas bleeds through the restrictor 25 which interconnects the main control chamber 21 and the expansion chamber 15. When the pressure in the expansion chamber 15 has reached a given level, depending on the strength of the expansion valve spring 19, the diaphragm 16 is displaced to open the valve port 17. This interconnects the main control chamber 21 and the expansion chamber 15 to produce a pressure drop in the former. The resultant downward force on the diaphragm 22 is now less than the resultant upward force on the diaphram 27, the latter being of lesser area, and these diaphragms are displaced upwardly to open the main valve port 30.

When the main valve port 30 is opened an outlet pulse commences and the gas flows through the main valve and the distributor valve to the appropriate pulse outlet conduit 38. When the main valve opens gas also passes through the passageway 47 and valve 48 to the chamber 45 to displace the diaphragm 46 and stem 49 upwardly to produce a resetting movement of the pawl 40.

The upward movement of the diaphragm 16 described above produces, after the axial clearance between the valve stem 20 and the valve member 18 has been taken up, an upward opening movement of the valve member 11 to open the pilot exhaust valve port 12. This exhausts the chamber 9 through the vent 14, and the resultant drop in pressure allows the exhaust valve spring 8 to open the exhaust valve. This exhausts the expansion chamber 15 and the passageway 5 through the chamber 2 and vent 3, and the resultant drop in pressure allows the expansion valve spring 19 to close the expansion valve thus breaking the main interconnection between the main control chamber 21 and the expansion chamber 15. Gas flowing through the restrictor 24 is now able once more to build up pressure in the main control chamber 21 to close the main valve whereupon the cycle of operations is repeated.

When the main valve is closed, the gas in the chamber 45 bleeds to atmosphere through the restrictor 52 to produce a downward retracting movement of the diaphragm 46 and stem 49. This enables the spring 54, in the already described manner, to produce an operative movement of the pawl and ratchet mechanism to index the distributor valve member 32 to place the valve chamber 33 in communication with that pulse outlet conduit 38 to which the next pulse is to be directed.

The pulses produced by the unit are fed from the conduits 38 to a number of main blast valves such as 60, one of which is shown in section in FIGURE 1 and one or more of which are associated with each conduit 38. Each of the blast valves 60 has a series of chambers 61, 62, 63 and 64 separated by three flexible impervious diaphragms 65, 66 and 67 of a diaphragm assembly.

The chamber 61 has an inlet connection 68 for connection to a pressure source of operating gas, for example the supply line 55 supplying the pulsator 1 as through a pipe 69, and an outlet 70 for the blast formed within the chamber 61 with a valve port 71 surrounded by an annular resilient sealing member 72. A valve closure member 73, adapted to engage the sealing member 72 to close the port 71, also serves to connect the three diaphragms 65, 66 and 67 axially to form the diaphragm assembly.

The chamber 62 has a bleed port 74 to atmosphere, the effective flow cross-section of this port being controlled by an adjustable bleed screw 74a. The chamber 62 also has an inlet connection 75 for connection to the corresponding pulse outlet conduit 38 of the pulsator 1, as by the pipe 76.

The diaphragm 66 separating the chambers 62 and 63 has an effective area greater than that of the diaphragm 65, and the chamber 63 is vented to atmosphere at 77. The diaphragm 67 has an effective area greater than that of the diaphragm 65 but less than that of the diaphragm 66.

A passageway 78 formed in the valve member 73 interconnects the chambers 61 and 64 so that both contain the operating gas at supply pressure. The chamber 64 is limited on one side by the diaphragm 67 and closed on the other by a dished end cap 79. Thus the supply pressure acts in opposite directions on the diaphragms 65 and 67, the differential force resulting from their different areas displacing the diaphragm assembly to close the valve port 71 with the valve member 73.

When a pulse is delivered from the pulsator 1 it acts differentially on the diaphragms 65 and 66, the differential force produced as a result of their different areas overcomes the differential force produced by the supply pressure in the chambers 61 and 64 to open the blast valve to start a blast period. At the end of the pulse the pressure in the chamber 62 bleeds away rapidly through the bleed port 74 allowing the supply pressure in the chambers 61 and 64 once more to close the valve and stop the blast. Adjustment of the bleed screw 74a controls the rate of closing of the blast valve at the end of each blast period and hence the blast duration.

It will be appreciated that the ratios of the effective areas of the three blast valve diaphragms are chosen to suit the particular installation concerned, and in particular depend upon the relationship between the operating gas pressure and the blast gas pressure. In the arrangement described both these pressures are equal, but it will be appreciated that this need not be so. In some installations it may be required that different pressures or even gases be used for these two purposes.

The timing valve 57 may be fitted to or located adjacent the pulsator 1 to provide local manual control of the interval between blasts and hence their periodicity. Alternatively, the timing valve may be disposed remotely to provide remote manual control or the valve replaced by control means, which may for example be automatic, arranged to supply gas under pressure to the connection 10 so that an overriding control of the operation of the pulsator is obtained.

In a structural modification of the described embodiment, the exhaust valve and the restrictor 25 are both dispensed with. The expansion chamber 15 exhausts directly to atmosphere through a restrictor and the timing chamber supplied through the timing valve 57 is positioned below the port 12, instead of above as in the described arrangement. As the pressure in the timing chamber builds up it produces an upward thrust on the valve member 11, this thrust serving to lift the diaphragm 16 to open the expansion valve. In order that this upward thrust may be effective for this purpose the stem 20 of the valve member 11 is rigidly connected to the valve member 18, and to ensure seating of the valve member 11 a floating seat is provided which surrounds the port 12. This seat is urged upwardly by the pressure in the timing chamber below and is capable of limited axial movement which allows seating to be obtained when the valve member 11 is in its lowermost position.

With such an arrangement, means are conveniently present to provide a delay to operation of the valve member 11. For example, the member 11 may be connected to a dashpot or a chamber above to form a diaphragm chamber which exhausts through a bleed port and the diaphragm of which is connected to the member 11. The restrictor through which the expansion chamber exhausts may be adjustable to control the blast duration.

Although powered movement of the diaphragm 46 produces a resetting movement of the pawl and ratchet mechanism in the illustrated embodiment, such diaphragm movement can be arranged to produce an operative movement of the pawl and ratchet mechanism and hence an indexing movement of the valve member 32. In this case, it may sometimes be found necessary to provide means which delay closing of the pilot exhaust valve, so that pressure operation of the diaphragm is produced for periods long enough for indexing movements of the valve member 32 to be completed.

In one practical construction similar to the arrangement illustrated, it has been found that immediately the diaphragm 16 commences to rise the sudden uprush of gas through the port 17 lifts it to the upper limit of its movement in about 0.001 second. This produces a very sharp move front to the pulse fed through the corresponding conduit 38. The shock wave in the chamber 62 of the main blast valve 60 exhausts, as described, through the bleed port 74. Adjustment of the bleed screw 74a enable the period of valve opening to be varied between about 0.02 and 1.0 second. The output pressure wave from the blast valve 60, plotted as a function of time, is of elongated pear-shaped form with a hard high pressure front.

I claim:

1. Control means for timing the duration and periodicity of a blast of pneumatic fluid, including a main valve responsive to pressure within a main control chamber, a first flow restrictor adapted to connect the main control chamber to pneumatic fluid under pressure and control the rate of pressure build-up in the main control chamber, an expansion chamber permanently connected to the main control chamber through a bleed passage, an expansion valve between the expansion chamber and the main control chamber and which is biased towards a closed position and is opened by pressure within the expansion chamber, an exhaust valve biased towards an open position and closed by pressure within timing chamber said exhaust valve controlling an exhaust path from the expansion chamber, a second flow restrictor adapted to connect the timing chamber to pneumatic fluid under pressure to control the rate of pressure build-up in the timing chamber, and a pilot exhaust valve, biased towards a closed position and opened responsive to opening of the expansion valve, said exhaust valve controlling an exhaust path from the timing chamber.

2. Control means according to claim 1, wherein the pilot exhaust valve is responsive directly to operation of the expansion valve.

3. Control means according to claim 2, wherein the pilot exhaust valve comprises a valve member mechanically coupled to a valve member of the expansion valve.

4. Control means according to claim 1, wherein the pilot exhaust valve is responsive to the pressure within the expansion chamber.

5. Control means according to claim 1, wherein the main valve closes in response to pressure rise in the main control chamber and opens in response to pressure drop in the latter when the expansion valve opens.

6. Control means according to claim 5, wherein the second flow restrictor comprises an adjustable timing valve.

7. Control means according to claim 6, wherein the first flow restrictor comprises an adjustable regulating valve.

8. Control means according to claim 1, wherein at least some of the valves are of diaphragm type, the various chambers being at least in part formed by the diaphragm chambers of the respective valves.

9. Control means according to claim 1, wherein the main valve is a pilot valve adapted to control one or more blast valves.

10. Control means according to claim 9, in combination with at least one blast valve.

11. Control means according to claim 10, wherein the blast valve is of diaphragm type and comprises a diaphragm chamber which in use is fed from the main valve to open the blast valve and exhausts directly to atmosphere through a bleed port.

12. Control means according to claim 11, wherein the effective area of the bleed port is adjustable.

13. Control means according to claim 11, wherein the blast valve comprises two further diaphragms, the differential area of which is arranged to be acted upon by pneumatic pressure producing the blast to close the diaphragm valve at the end of each blast period.

14. Control means according to claim 1, and further comprising a distributor valve, a plurality of pulse outlet conduits, and a pawl and ratchet mechanism arranged to operate the distributor valve to connect the main valve to the outlet conduits in turn.

15. Control means according to claim 1, wherein the exhaust valve opens at a given pressure in the timing chamber.

16. Control means for timing the duration and periodicity of a blast of pneumatic fluid, including a main control chamber, an expansion chamber and a timing chamber each adapted to be supplied at a metered rate from a pressure supply of operating fluid, pneumatically-operated expansion valve means biased towards a closed position and opened by a rise in pressure within the expansion chamber, said expansion valve means including a port connecting the main control chamber and the expansion chamber and which is alternately opened and closed by operation of said expansion valve means, pneumatically-operated exhaust valve means biased towards an open position and closed by a rise in pressure in said timing chamber to cyclically connect and disconnect said expansion chamber to and from atmosphere to lower and raise the pressure in said expansion chamber, further exhaust valve means, biased towards a closed position and opened by opening movement of said expansion valve means, to connect and disconnect said timing chamber to and from atmosphere, and a main valve connected to a flexible wall of said control chamber and controlled automatically in response to pressure changes in said control chamber.

17. Control means according to claim 16, wherein the pawl and ratchet mechanism is arranged to operate in dependence upon operation of the main valve, opening of the main valve producing a resetting movement of the mechanism.

18. Control means according to claim 16, wherein said expansion chamber is permanently connected to the main control chamber via a bleed passage.

19. A method of controlling the duration and periodicity of a succession of blasts of pneumatic fluid, comprising the steps of supplying pneumatic fluid to a main control space at a metered rate to produce a pressure rise therein, bringing about the cessation of a blast period in response to this pressure rise, continuously bleeding the pneumatic fluid from the main control space to the expansion space, supplying pneumatic fluid to an auxiliary control space at a metered rate to produce a pressure rise therein, closing an exhaust passage from the expansion space in response to the last-mentioned pressure rise to produce a pressure rise in the expansion space, automatically interconnecting the main control space and the expansion space in response to the pressure rise in the latter to produce a pressure drop in the main control space and a pressure rise in the expansion space, bringing about commencement of a fresh blast period in response to the pressure drop in the main control space and opening an exhaust passage from the auxiliary control space in response directly to the pressure rise in the expansion space thereby to produce a pressure drop in the auxiliary control space, opening the exhaust passage from the expansion space in response to the pressure drop in the auxiliary control space to produce a pressure drop in the expansion space, and breaking the interconnection between the main control space and the expansion space and closing the exhaust passage of the auxiliary control chamber in response to the pressure drop in the expansion space.

References Cited in the file of this patent
UNITED STATES PATENTS

| | | |
|---|---|---|
| 1,841,433 | Finnegan | Jan. 19, 1932 |
| 2,368,832 | Hauser | Feb. 6, 1945 |
| 2,611,392 | Johnson | Sept. 23, 1952 |
| 2,649,331 | Peltz et al. | Aug. 18, 1953 |
| 2,694,404 | Alexander et al. | Nov. 16, 1954 |
| 2,738,807 | Addison | Mar. 20, 1956 |
| 2,745,625 | Booth | May 15, 1956 |
| 2,748,666 | Forrest | June 5, 1956 |
| 2,825,923 | De Mart | Mar. 11, 1958 |
| 2,893,416 | Hegstad | July 7, 1959 |
| 2,947,323 | Becker | Aug. 2, 1960 |